(12) United States Patent
Wiles (10) Patent No.: US 10,399,252 B2
(45) Date of Patent: Sep. 3, 2019

(54) SELF-HEATING TOOL AND METHOD OF MANUFACTURING A COMPOSITE COMPONENT USING THE SAME

(71) Applicant: ROLLS-ROYCE PLC, London (GB)

(72) Inventor: Gary Wiles, Derby (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 15/123,189

(22) PCT Filed: Feb. 27, 2015

(86) PCT No.: PCT/GB2015/050572
§ 371 (c)(1),
(2) Date: Sep. 1, 2016

(87) PCT Pub. No.: WO2015/132564
PCT Pub. Date: Sep. 11, 2015

(65) Prior Publication Data
US 2017/0066159 A1   Mar. 9, 2017

(30) Foreign Application Priority Data

Mar. 1, 2014 (GB) .................................. 1403637.0

(51) Int. Cl.
*B29C 33/08* (2006.01)
*B29C 70/44* (2006.01)
(Continued)

(52) U.S. Cl.
CPC .............. *B29C 33/08* (2013.01); *B29C 33/00* (2013.01); *B29C 33/02* (2013.01); *B29C 70/44* (2013.01);
(Continued)

(58) Field of Classification Search
CPC ........ B29C 70/446; B29C 33/02; B29C 33/00; B29C 33/08; B29C 70/44; B29C 33/06;
(Continued)

(56) References Cited

U.S. PATENT DOCUMENTS 4,557,422 A * 12/1985 Gill ....................... B29C 53/821
242/443
4,943,334 A * 7/1990 Medney ................ B29C 53/564
156/169
(Continued)

FOREIGN PATENT DOCUMENTS

DE   3911312 C1   4/1990
DE   4100510 A1   7/1992
(Continued)

OTHER PUBLICATIONS

Jul. 30, 2014—(GB)—Search Report—App. No. GB1403637.0—3 pages.
May 21. 2015—(WO)—International Search Report and Written Opinion—App. No. PCT/GB2015/050572—10 pages.

*Primary Examiner* — Vishal I Patel
(74) *Attorney, Agent, or Firm* — Banner & Witcoff, Ltd.

(57) ABSTRACT

There is disclosed a self-heating tool (10) for manufacturing a composite component, comprising: a support structure (24); a mandrel (26) onto which composite material can be applied; a heater (58) for heating the mandrel (26) during a curing operation; and a plurality of extendible support members (28) extending between the support structure (24) and the mandrel (26) to support the mandrel (26). Each extendible support member (28) is configured to change in length in response to thermal expansion of the mandrel (28) during a curing operation. A method of manufacturing a composite component using a self-heating tool is also disclosed.

16 Claims, 4 Drawing Sheets

(51) Int. Cl.
   *B29C 33/02*     (2006.01)
   *B29C 33/00*     (2006.01)
   *B29K 105/08*    (2006.01)
   *B29K 307/04*    (2006.01)

(52) U.S. Cl.
   CPC .... *B29C 70/446* (2013.01); *B29K 2105/0872* (2013.01); *B29K 2307/04* (2013.01); *B29K 2995/0012* (2013.01)

(58) Field of Classification Search
   CPC .... B29K 2995/0012; B29K 2105/0872; B29K 2307/04
   See application file for complete search history.

(56) References Cited

U.S. PATENT DOCUMENTS

2006/0130993 A1* 6/2006 Blanton .................. B29C 70/44
                                                          164/97
2010/0139850 A1* 6/2010 Morris .................. B29C 33/485
                                                          156/242

FOREIGN PATENT DOCUMENTS

| EP | 2602082 | A2 | 6/2013 |
| GB | 1284162 | A  | 8/1972 |

\* cited by examiner

SELF-HEATING TOOL AND METHOD OF MANUFACTURING A COMPOSITE COMPONENT USING THE SAME

CROSS REFERENCE TO RELATED APPLICATIONS

This application is a National Stage Application under 35 U.S.C. § 371 of co-pending PCT application number PCT/GB2015/050572, filed 27 Feb. 2015; which claims priority to GB1403637.0, filed 1 Mar. 2014, both of which are hereby incorporated by reference in their entireties for any and all non-limiting purposes.

The invention relates to a self-heating tool for manufacturing a composite component.

Composite components are frequently used for applications requiring a combination of light weight and strength, for example in sports equipment and in aerospace components. Composite components are manufactured from composite material including a reinforcement material (e.g. carbon fibre) and a matrix material (e.g. epoxy resin).

It is known to manufacture composite components by laying up composite material on a tool, and subsequently curing the composite material in situ on the tool within an autoclave. Once cured, the tool and composite component is removed from the autoclave, and the composite component is removed from the tool.

It is desirable to manufacture large components from composite materials, such as casings for gas turbine engines, since the light weight of the composite material may offer significant performance benefits. However, such components require very large and/or bespoke autoclaves for curing, which can be expensive.

In a broad aspect the invention relates to a self-heating tool for manufacturing a composite component, comprising: a support structure; a mandrel onto which composite material can be applied; a heater for heating the mandrel during a curing operation; and a plurality of extendible support members extending between the support structure and the mandrel to support the mandrel.

According to a first aspect of the invention there is provided a self-heating tool for manufacturing a composite component, comprising: a support structure; a mandrel onto which composite material can be applied; a heater for heating the mandrel during a curing operation; and a plurality of extendible support members extending between the support structure and the mandrel to support the mandrel; wherein each extendible support member is configured to change in length in response to thermal expansion of the mandrel during a curing operation.

Each extendible support member is configured to change in length independently of any thermal expansion of the extendible support member.

The self-heating tool may be configured so that the mandrel thermally expands relative to the support structure during a curing operation. The heater may be configured so that the mandrel thermally expands relative to the support structure during a curing operation. Each extendible support member may be configured to change in length along a direction between the support structure and the mandrel.

Each extendible support member may be generally linearly extending between the support structure and the mandrel, and each extendible support member may comprise a non-linear portion that is deformable so as to change the length of the extendible support member. The non-linear portion may comprise first and second sections angled with respect to each other. The first and second sections may be moveable relative to each other in flexion and extension. The first and second sections may be angularly moveable relative one another. The self-heating tool may further comprise a third section angled with respect to the second section and moveable relative to the second section in flexion and extension.

The non-linear portion may be configured to straighten to increase the length of the extendible support member. The non-linear portion may be configured to bend to decrease the length of the extendible support member.

The non-linear portion may comprise at least one weakened hinge. The weakened hinge may be formed by one or more cut-outs extending through the extendible support member. The weakened hinge may be formed by a comparatively thin section of the non-linear portion (relative to other sections of the non-linear portion), or by scoring the non-linear portion or by forming trenches, notches or recesses in the non-linear portion. The hinge may be configured to concentrate stress in a particular section or sections of the non-linear portion so that these sections preferentially deform when the extendible support member is loaded in tension or compression.

The self-heating tool may further comprise vacuum bagging apparatus for forming a vacuum bag seal over composite material applied on the mandrel.

The mandrel may be drafted so that the composite component can be removed from the mandrel after a curing operation. In this context the term drafted means the mandrel has a positive draft angle with respect to an axial direction of the self-heating tool so that the tool and a composite component formed thereon can be separated by relative axial movement.

The heater may be arranged to directly heat only the mandrel. There may be a single heater. The heater may comprise a plurality of heating elements. The heater may comprise heating control apparatus for controlling the heating elements to heat the mandrel to a desired curing temperature. The heating elements may be attached to the mandrel.

The mandrel may have a lay-up surface onto which composite material can be applied and an opposing underside surface. The heating elements may be attached to the underside surface. The mandrel may be of substantially uniform thickness. The mandrel may be in the form of a plate or layer. The mandrel may be formed from rolled or sheet material, such as stainless steel.

The mandrel may comprise a generally convex lay-up surface. The mandrel may be annular and each extendible support member may extend in a substantially radial direction between the support structure and the mandrel. Each extendible support member may generally linearly extend along the radial direction. The mandrel may be axisymmetric.

The mandrel may be arranged to radially thermally expand during a curing operation so that composite material applied thereon is placed under tension.

According to a second aspect of the invention there is provided tooling apparatus for manufacturing a composite component, comprising two self-heating tools, each in accordance with any statement herein, wherein the mandrels are annular and are arranged to cooperate so as to define a continuous lay-up surface. The mandrels may be drafted in opposing directions so that they cooperate to form a neck.

According to a third aspect of the invention there is provided a method of manufacturing a composite component using a self-heating tool in accordance with the first aspect of the invention, the method comprising: laying up composite material on the mandrel; and heating the mandrel using the heater to cure the composite material; wherein heating the mandrel causes it to undergo thermal expansion relative to the support structure, and wherein the extendible support members accommodate the relative thermal expansion by changing in length.

There is also provided a method of manufacturing a composite component on tooling apparatus in accordance with the third aspect of the invention, the method comprising: laying up composite material on the mandrels; heating the mandrels using the heater to cure the composite material; wherein heating the mandrels causes them to undergo thermal expansion relative to the respective support structures, and wherein the extendible support members accommodate the relative thermal expansion by changing in length.

The invention may comprise any combination of the features and/or limitations referred to herein, except combinations of such features as are mutually exclusive.

Embodiments of the invention will now be described, by way of example, with reference to the accompanying drawings, in which.

Figure 1:
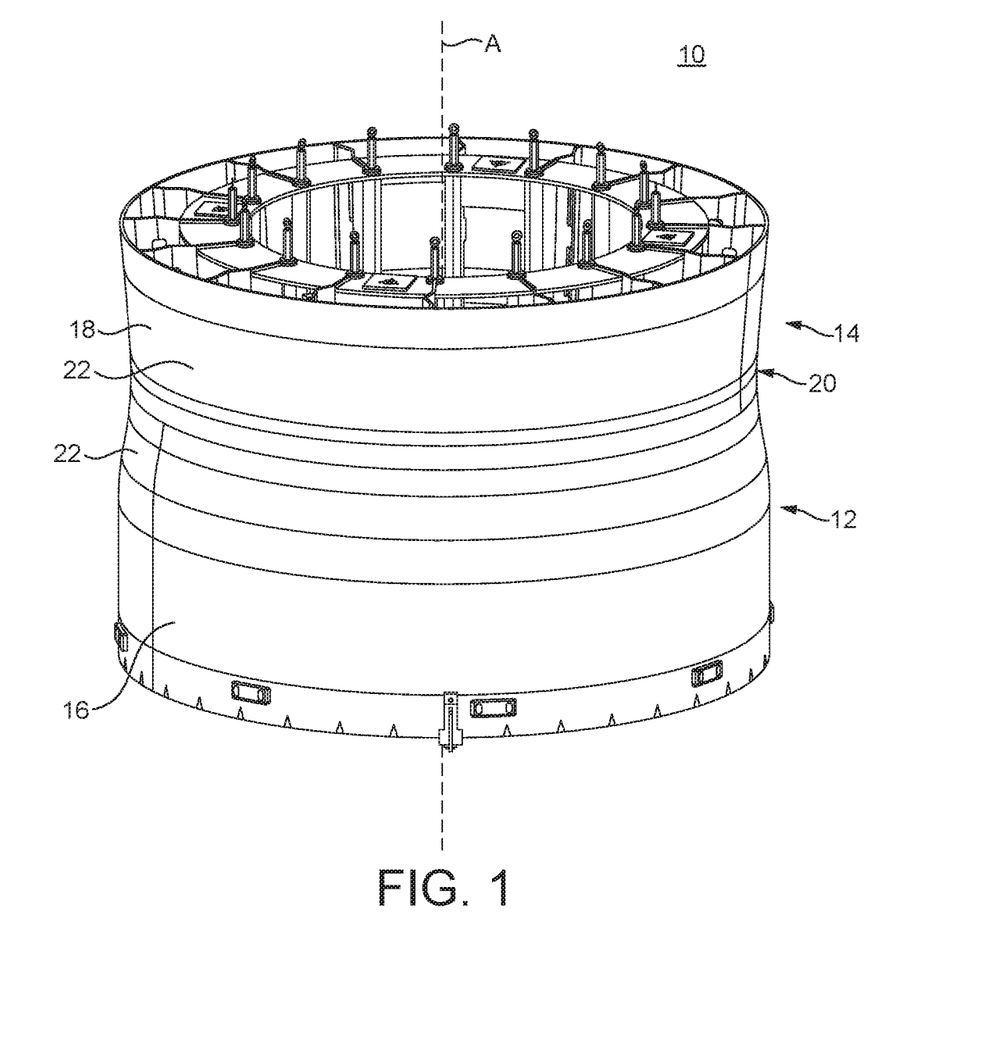
FIG. 1 shows a perspective view of tooling apparatus including two self-heating tools.

As shown in FIG. 1, a tooling apparatus 10 for a gas turbine engine casing comprises lower and upper self-heating tools 12, 14, each having a revolved lay-up surface 16, 18 to which composite material can be applied (otherwise known as "layed-up"). The two self-heating tools 12, 14 are coaxially arranged about an axis A of the tooling apparatus so that the lay-up surfaces 16, 18 meet at a neck 20 and define a substantially continuous lay-up surface 22 extending across both tools 12, 14.

The lower and upper tools 12, 14 correspond to forward and aft portions of a gas turbine engine casing respectively. The tooling apparatus shown is approximately three meters in diameter.

Figure 2:
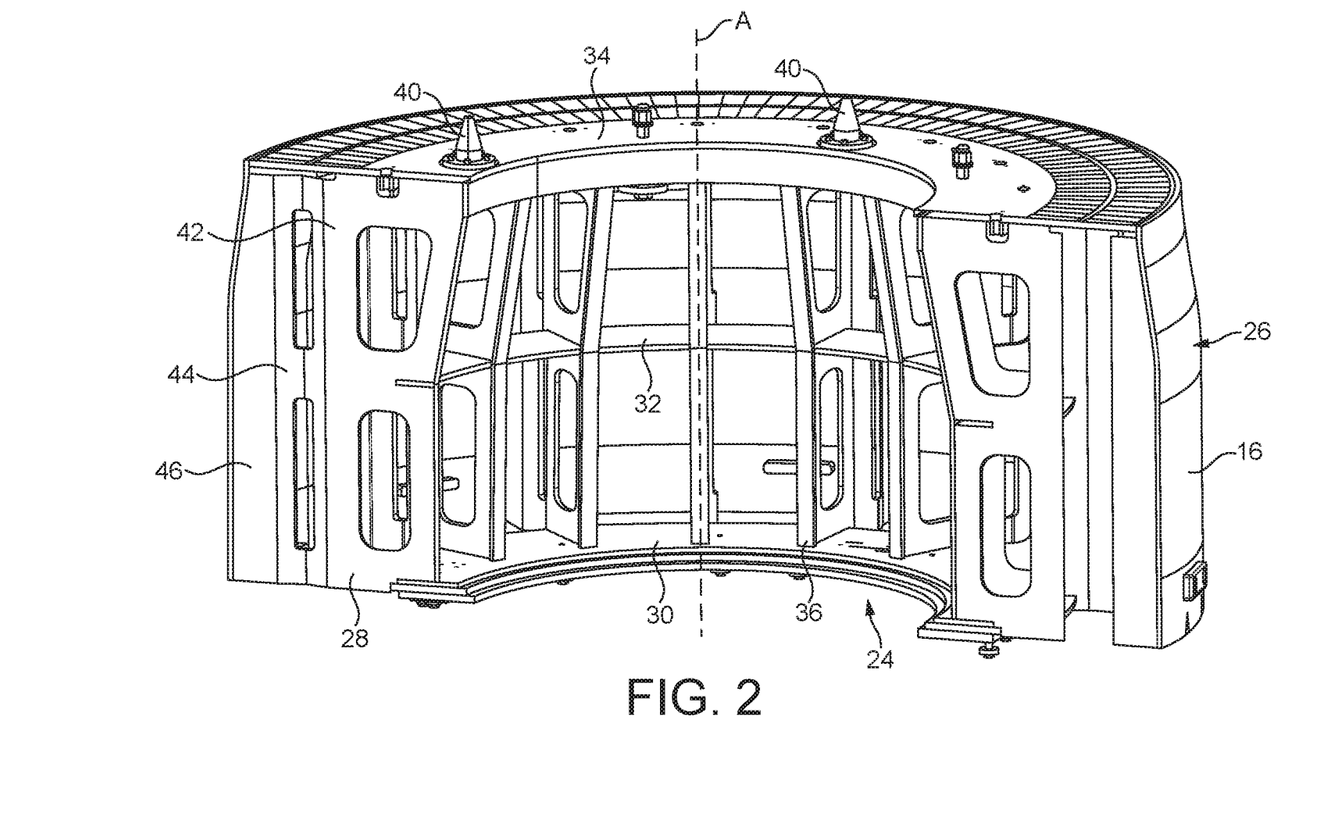
FIG. 2 shows a cut-away perspective view of one of the self-heating tools of FIG. 1.
Figure 3:
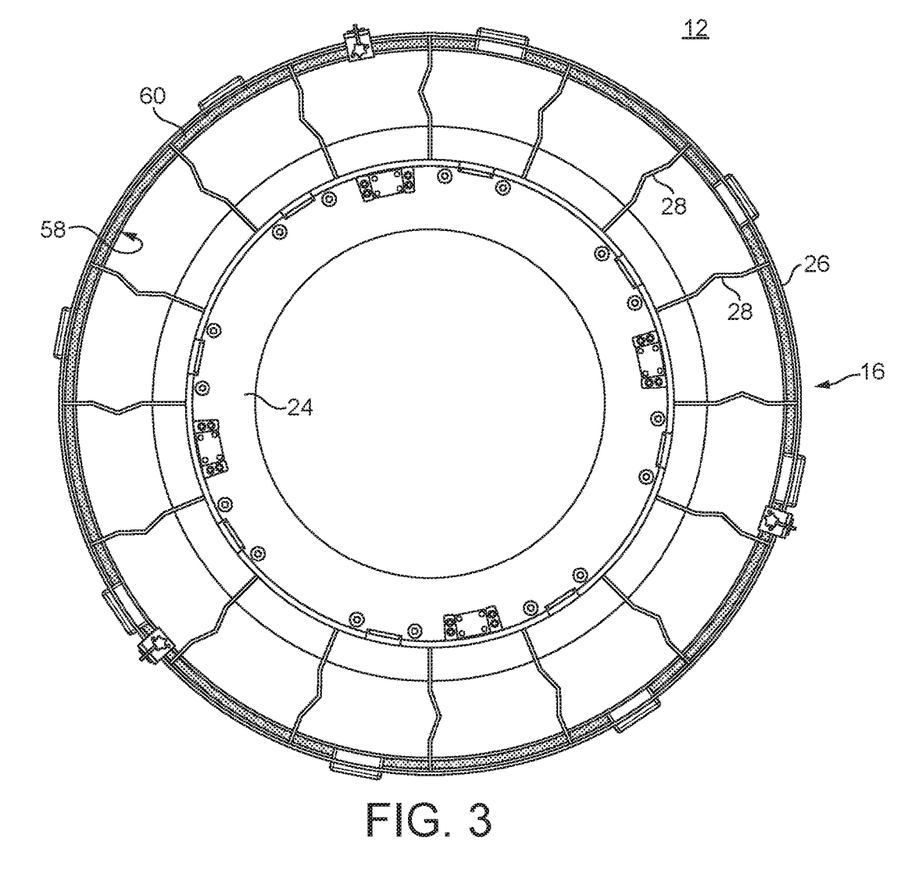
FIG. 3 shows a plan view of the self-heating tool of FIG. 2.

As shown in FIGS. 2 and 3, the lower self-heating tool 12 comprises a centrally located support structure 24, a mandrel 26 and a plurality of extendible support members 28 extending between the support structure 24 and the mandrel 26 to support the mandrel 26. The upper self-heating tool 14 comprises substantially equivalent components.

The support structure 24 comprises three axially separated support rings 30, 32, 34 joined by angularly spaced axial support beams 36. Although the beams 36 extending between the upper two rings 32, 34 are inclined to the axis A of the tool, they have an axial component and so are described as "axial support beams". The rings 30, 32, 34 and beams 36 are welded together to form a rigid support structure 24.

The lower ring 30 has a radially outer profile that is stepped corresponding to a radially inner profile that is stepped of the extendible support members 28.

The middle ring 32 comprises a series of angularly spaced slots radially extending from the radially outer edge of the ring 32 approximately midway into the ring 32. The slots are arranged to cooperate and interlock with the extendible support members 28, as will be described in detail below.

The upper ring 34 extends radially outwardly beyond the lower and middle rings 30, 32 towards the mandrel 26. The mandrel 26 is supported by the extendible support members 28 and the upper ring 34. The upper ring 34 is provided with a series of angularly spaced locating projections 40 for locating with corresponding locating recesses (not shown) coupled to a corresponding ring (not shown) of the upper self-heating tool 14.

A series of angularly spaced extendible support members 28 are coupled to the support structure 24 by welding and extend substantially radially outwardly from the support structure to the mandrel 26. In the embodiment shown in FIG. 2, there are sixteen extendible support members 28 equally angularly spaced around the support structure 24 (eight are shown in the cut-away view), and the support structure 24 has an equal number of axial support beams 36.

Figure 4:
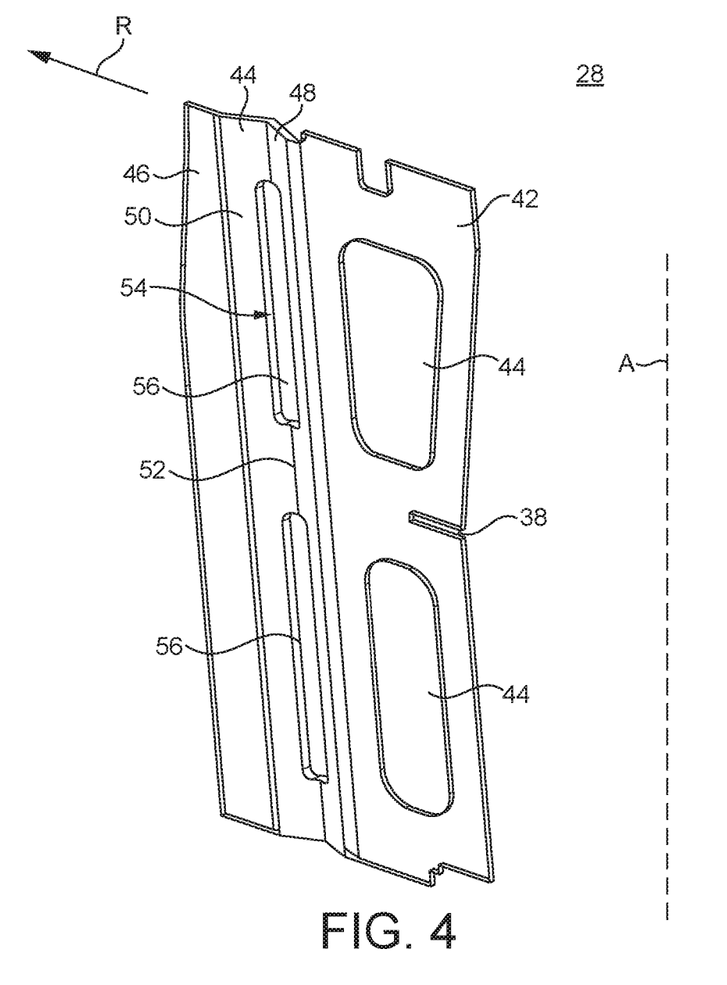
FIG. 4 shows an extendible support member of the self-heating tool of FIG. 2.

As best shown in FIG. 4, each extendible support member 28 comprises a radially inner planar portion 42, a non-linear portion 44 and a radially outer portion 46, which are all integrally formed from a single piece of material, such as rolled stainless steel. The radially inner planar portion 42 is coupled by welding to each of the three support rings 30, 32, 34 and to a respective axial support beam 36. It is provided with a lateral slot 38 for receiving a portion of the central support ring 32 and interlocking with the slot of the central support ring 32 described above. The radially inner planar portion 42 has two cut-outs 44 which serve to save weight, reduce material cost and enable easier handling and assembly of the tool 12.

The non-linear portion 44 has an overall length (or overall linear extent) along a substantially radial direction R between the radially inner planar portion 42 and the radially outer planar portion 46, but is itself non-linear in that it diverges from the radial direction R. The non-linear portion 44 is deformable to change in length along the radial direction, so as to change the overall length (or linear extent) of the extendible support member 28 along the radial direction R.

In this embodiment the non-linear portion 44 comprises a first radially inner section 48 integrally formed with a second radially outer section 50, the two sections 48, 50 meeting at a weakened hinge 52 axially extending parallel to the axis A of the self-heating tool 12. The first and second sections 48, 50 are angled with respect to each other and are angularly moveable with respect to each other about the hinge 52 so as to change the length of the non-linear portion 44. For example, as the two sections 48, 50 are straightened (i.e. the angle between them approaches 180°), the length of the non-linear portion 44, and of the extendible support member 28, increases. Further, as the two sections 48, 50 are bent (i.e. the angle between them reduces), the length of the non-linear portion 44, and of the extendible support member 28, decreases. The straightening motion can be referred to as extension, whereas the bending motion can be referred to as flexion.

The weakened hinge 52 is formed by two cut-outs 56 extending through the extendible support member 28 that effectively reduce the cross-sectional area of the weakened hinge 52 compared with the remainder of the non-linear portion 44, so that, under load, the weakened hinge 52 deforms in preference to the rest of the non-linear portion 44.

In other embodiments, the weakened hinge 52 may be formed in other ways, for example, by providing a comparatively thinner section of the non-linear portion 44, by scoring, by forming notches or otherwise manufacturing the non-linear portion 44 to be more susceptible to deformation at a particular location or locations, and/or to be predisposed to deforming in a controlled manner.

The radially outer portion 46 of the extendible support member 28 has a profiled radially outer face corresponding to the inner surface of the mandrel 26, and is coupled to the mandrel 26 by welding.

Referring back to FIGS. 2 and 3, the mandrel 26 is a plate-like revolved structure comprising a series of curved plates joined together (for example, by welding) to define a lay-up surface 16. In this embodiment the mandrel 26 is made of rolled stainless steel and has a substantially uniform thickness. The mandrel 26 is drafted so that it can be separated from a composite component formed thereon by relative axial movement.

As shown in FIG. 3, the self-heating tool 12 is provided with a heater 58 having a heating control unit (not shown) coupled to an electrical power source (not shown) and a plurality of heating pads 60 attached to the radially inner surface of the mandrel 26. The heating control unit is configured to monitor the temperature of the mandrel 26 and to control the heat output of the heating pads 60 accordingly. The heating pads 60 are arranged to directly heat only the mandrel 26 by way of conduction. There are no heating pads 60 for directly heating the extendible support members 28 or the support structure 24. In this embodiment the heater 58 is arranged to heat the mandrels 26 of both the lower and upper self-heating tools 12, although in other embodiments each tool 12, 14 may be provided with its own heater 58.

The upper tool 14 is substantially identical to the lower tool 12.

Vacuum bag clamps and vacuum pumps (not shown) are provided at the upper and lower ends of the tooling apparatus 10 for securing a vacuum bag over composite material applied onto the tooling apparatus 10, as will be described below.

In use, the upper self-heating tool 14 is hoisted into place above the lower self-heating tool 12 and coupled to the lower self-heating tool 12 in a coaxial arrangement. The tools 12, 14 are coaxially aligned by way of the locating projections 40 and locating recesses (not shown) of the respective tools 12, 14 such that the lay-up surfaces 16, 18 of the tools 12, 14 define a continuous lay-up surface 22 having a neck 20 where the tools meet.

Composite material is applied onto the tooling apparatus 10 in the form of carbon composite tape pre-impregnated with a resin matrix material (known as "pre-preg" composite material). The tape is applied by a robot cell to form successive layers of composite material on the continuous lay-up surface 22.

A vacuum bag is then secured over the composite material using the vacuum bag clamps. The vacuum pump is activated to withdraw air from between the mandrel 26 and the vacuum bag so that a pressure force corresponding to atmospheric pressure compresses the vacuum bag and composite material against the mandrel 26.

The heater 58 is activated to heat the mandrels 26 of the tools 12, 14 to a curing temperature in the range of 100° C. to 180° C. or a curing time of approximately 8 hours, depending on the type of resin matrix material used. As the mandrels 26 are heated, they positively thermally expand, and move radially outwardly relative to the support structure 24 owing to the curvature of the mandrels 26 around the support structure 24. The radially outward expansion of each mandrel 26 relative to the support structure 24 puts a tension load on the extendible support members 28. The tension load causes the first and second sections 48, 50 of the non-linear portion 44 of each extendible support member 28 to straighten with respect to each other, so that the non-linear portion 44 increases in length. Accordingly, the length (or radial extent) of the extendible support member 28 increases to accommodate the thermal expansion of the mandrel 26 relative to the support structure 24.

The radial thermal expansion of the mandrel 26 causes the circumference of the mandrel 26 to increase, thereby putting the composite material applied to the mandrel 26 under tension, which can be beneficial for forming a strong composite component. Further, the vacuum bag applied over the composite material is stretched by the thermal expansion of the mandrel 26, which has the beneficial effect of smoothing out any wrinkles in the composite material that may affect the finish of the composite component. In addition, the thermal expansion of the mandrel 26 against the vacuum bag may apply an additional compressive force to the composite material therebetween.

Since the extendible support members 28 are not directly heated, they are significantly cooler than the mandrel 26 during the curing operation. The extension of the extendible support members 28 during the curing operation occurs in response to the tension load caused by the mandrel 26 thermally expanding radially outward relative to the support structure 24, rather than by thermal expansion of the extendible support members 28 themselves. Since each extendible support member 28 is directly coupled to the mandrel 26, an amount of heat will be conducted from the mandrel 26 into the radially outer end of each extendible support member 28, resulting in a temperature gradient along the extendible support member 28. However, the extension of each extendible support member 28 during the curing operation is driven by the tension force applied to the extendible support member 28 and is independent of any thermal expansion of the extendible support member 28.

Once the curing operation is complete the heater 58 is deactivated and the mandrel 26 and the composite component formed thereon are allowed to cool. Each mandrel 26 therefore thermally contracts and moves radially inwardly towards the support structure 24, resulting in a radial compression force on the extendible support members 28. The compression force causes the first and second sections 48, 50 of the non-linear portion 44 of each extendible support member 28 to bend with respect to each other (flexion). Accordingly, the length (or radial extent) of the extendible support members 28 reduces in response to the contraction of the mandrel 26.

Once cooled, the vacuum bag is removed from the tooling apparatus 10. The upper self-heating tool 14 is then detached from the lower self-heating tool 12 and axially lifted free of the composite component formed thereon. This is possible because the mandrel of the upper self-heating tool 14 is drafted towards the neck 20. The composite component is then lifted free from the lower self-heating tool 12. Again, this is possible because the lower self-heating tool 12 is drafted towards the neck 20.

The self-heating tool of the invention allows a large composite component to be formed out of an autoclave, resulting in significantly reduced manufacturing costs. In particular, there is no need for a manufacturer to commission an autoclave sufficiently large to accommodate the composite component and a corresponding tool.

Further, the self-heating tool overcomes several problems that are not encountered when using an autoclave curing process, but only arise when attempting an out-of-autoclave curing process. In particular, in an autoclave curing process, a tool is heated uniformly within the autoclave. Accordingly, for a curved tool, such as an annular tool for a gas turbine casing, a support structure for a mandrel thermally expands together with the mandrel. The support structure therefore accommodates the thermal expansion of the mandrel by thermally expanding itself. Accordingly, the welds (or other joints) between the support structure and the mandrel are not placed under strain. In an out of autoclave process, the extendible support members prevent the welds between the mandrel and the support structure from failing when the mandrel thermally expands relative to the support structure.

Although it has been described that the extendible support members have a radially inner planar portion for connecting to the support structure, a radially outer planar portion for connecting to the mandrel, and a non-linear portion extending between the two planar portions, it will be appreciated that in other embodiments the extendible support members may be formed differently. For example, an extendible support member may only comprise a non-linear portion which extends from the support structure to the mandrel, with no planar portions on either side.

Although it has been described that the various portions of each extendible support member are integrally formed from a single piece of material, it will be appreciated that in other embodiments the various portions may be separate elements coupled together, for example, by welding or by a mechanical fastener.

Although embodiments of a self-heating tool have been described in which the mandrel has a revolved profile, in other embodiments the mandrel may generally extend around the support structure but may have an irregular profile. For example, the mandrel may have any combination of convex, concave and relatively straight portions, according to the shape of the component to be formed on the component. For example, a self-heating tool according to the invention may be for a root portion of a wind turbine blade, and consequently the mandrel may have a lay-up surface corresponding to the pressure side and the suction side of the blade.

Although embodiments of a self-heating tool have been described in which the mandrel forms a closed loop (e.g. an annulus) around the support structure, in other embodiments the mandrel may define a lay-up surface for an open or plate-like component. For example, the mandrel may define a curved lay-up surface for the suction side only of a wind turbine blade. The lay-up surface may be generally convex in that it extends around the support structure, so that the mandrel moves away from the support structure as it thermally expands.

I claim:

1. A self-heating tool for manufacturing a composite component, comprising:
   a support structure;
   a mandrel onto which composite material can be applied;
   a heater for heating the mandrel during a curing operation; and
   a plurality of extendible support members extending between the support structure and the mandrel to support the mandrel;
   wherein each extendible support member is configured to change in length independently of any thermal expansion of the extendible support member in response to thermal expansion of the mandrel during the curing operation,
   wherein each extendible support member is configured to change in length along a direction between the support structure and the mandrel, and
   wherein each extendible support member is generally linearly extending between the support structure and the mandrel, and wherein each extendible support member comprises a non-linear portion that is deformable so as to change the length of the extendible support member.

2. The self-heating tool according to claim 1, wherein the tool is configured so that the mandrel thermally expands relative to the support structure during the curing operation.

3. The self-heating tool according to claim 1, wherein the non-linear portion comprises first and second sections angled with respect to each other.

4. The self-heating tool according to claim 1, wherein the non-linear portion of each extendible support member is configured to straighten to increase the length of the extendible support member.

5. The self-heating tool according to claim 1, wherein the non-linear portion comprises at least one weakened hinge.

6. The self-heating tool according to claim 5, wherein the weakened hinge of each extendible support member is formed by one or more cut-outs extending through the extendible support member.

7. The self-heating tool according to claim 1, further comprising vacuum bagging apparatus for forming a vacuum bag seal over composite material applied on the mandrel.

8. The self-heating tool according to claim 1, wherein heater is arranged to directly heat only the mandrel.

9. The self-heating tool according to claim 1, wherein heater is attached to the mandrel.

10. The self-heating tool according to claim 1, wherein the mandrel comprises a generally convex lay-up surface.

11. A self-heating tool for manufacturing a composite component, comprising:
    a support structure;
    a mandrel onto which composite material can be applied;
    a heater for heating the mandrel during a curing operation; and
    a plurality of extendible support members extending between the support structure and the mandrel to support the mandrel;
    wherein each extendible support member is configured to change in length independently of any thermal expansion of the extendible support member in response to thermal expansion of the mandrel during the curing operation, and
    wherein the mandrel is annular; and wherein each extendible support member extends in a substantially radial direction between the support structure and the mandrel.

12. The self-heating tool according to claim 11, wherein the mandrel is arranged to radially thermally expand during the curing operation so that composite material applied thereon is placed under tension.

13. A self-heating tool for manufacturing a composite component, comprising:
    a support structure;
    a mandrel onto which composite material can be applied;
    a heater for heating the mandrel during a curing operation; and
    a plurality of extendible support members extending between the support structure and the mandrel to support the mandrel;
    wherein each extendible support member is configured to change in length independently of any thermal expansion of the extendible support member in response to thermal expansion of the mandrel during the curing operation, and
    wherein each extendible support member is generally linearly extending between the support structure and the mandrel, and wherein each extendible support member comprises a non-linear portion that is deformable so as to change the length of the extendible support member.

14. The self-heating tool according to claim 13, wherein the non-linear portion comprises first and second sections angled with respect to each other.

15. The self-heating tool according to claim 13, wherein the non-linear portion comprises at least one weakened hinge.

16. The self-heating tool according to claim 13, wherein the non-linear portion of each extendible support member is configured to straighten to increase the length of the extendible support member.

\* \* \* \* \*